Nov. 1, 1955  P. McDONALD  2,722,282
ACOUSTIC WELL LOGGING SYSTEM
Filed Aug. 24, 1950  2 Sheets-Sheet 1

Pat McDonald
INVENTOR.

BY
D. Carl Richards
AGENT

Nov. 1, 1955  P. McDONALD  2,722,282
ACOUSTIC WELL LOGGING SYSTEM
Filed Aug. 24, 1950  2 Sheets-Sheet 2

PAT McDONALD
INVENTOR.
BY
D. Carl Richards
AGENT

United States Patent Office 2,722,282
Patented Nov. 1, 1955

2,722,282

ACOUSTIC WELL LOGGING SYSTEM

Pat McDonald, Oklahoma City, Okla., assignor, by mesne assignments, to Socony Mobil Oil Company, Inc., a corporation of New York Application August 24, 1950, Serial No. 181,284

2 Claims. (Cl. 181—.5)

This invention relates to the measurement of the acoustic properties of the earth and more particularly to a system for producing a log of the acoustic properties of formations penetrated by a well bore.

The stratified sediments forming the earth's crust, differing widely in their physical properties and in their fluid content, are subjected to concentrated study in the course of the search for petroleum deposits in order accurately to locate possible oil and gas producing zones along the length of well bores. Electrical resistivity and self-potential logs are routinely thus employed in uncased holes but are inapplicable in cased holes. Radioactivity logs may be obtained in cased holes. Since the acoustic properties are related to porosity and permeability of the formations as well as their fluid content, logs showing variations in hardness, acoustic velocity, or acoustic impedance, although ordinarily not readily obtained, are considered to be of great value.

The present invention resides in provisions for obtaining an improved acoustic log of the formations adjacent to either a cased or uncased well bore.

It is an object of the invention to provide a log of the respective subsurface formations traversed by a bore hole by obtaining electrical indications developed from an acoustical effect that is dependent upon the acoustic properties of the earth at a given point in the well plus the acoustic properties of the system itself.

More particularly, in one form of the invention there is provided an acoustic well logging system which comprises a rigid wall forming a closed pulse-transmitting chamber and a rigid wall forming a closed pulse-receiving chamber. The walls in their entirety are of a strength sufficient throughout all portions thereof to withstand pressures existing in deep bore holes. A generator of acoustic signals is positioned within the pulse-transmitting chamber and supported in spaced relation with the walls thereof. A receiver of acoustic energy is supported within the pulse-receiving chamber in spaced relation with the walls thereof. A liquid medium within each chamber forms substantially the sole path of transfer of acoustic energy between the generator and the wall adjacent thereto and between the receiver and the wall adjacent thereto. Structure mechanically interconnecting the walls of the chambers and acoustically mismatched with respect thereto is provided to control the transfer of energy directly from the pulse-transmitting chamber to the pulse-receiving chamber for the desired blending with the acoustic energy traveling from the pulse-transmitting chamber to the pulse-receiving chamber via the liquid in the bore hole and via the formations adjacent thereto.

For a more complete understanding of the invention, reference may now be had to the following description taken in conjunction with the accompanying drawings in which.

Figure 1:
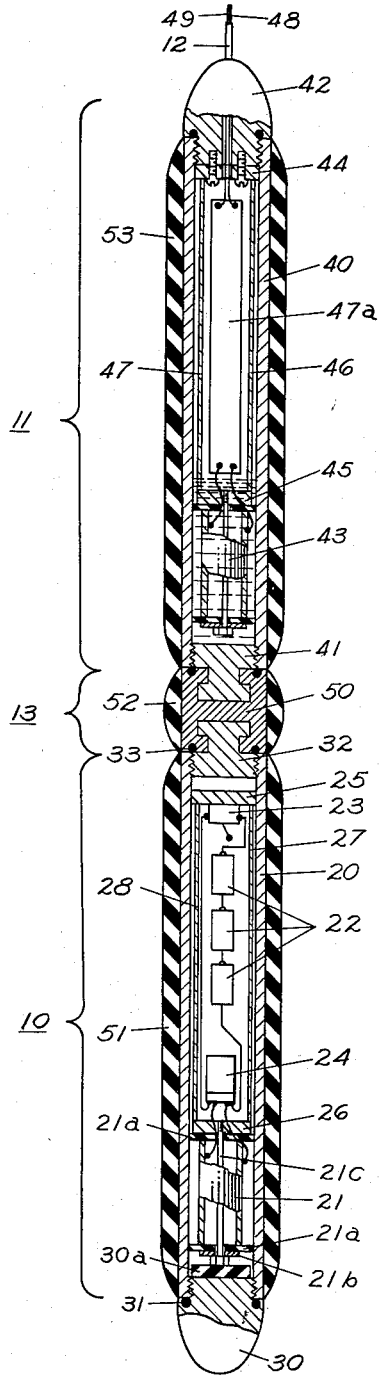
Fig. 1 is a sectional view of the logging instrument.

Referring to Fig. 1, there is illustrated a well exploring tool or probe that includes a transmitter 10 in which acoustic energy is developed and transmitted for travel to a receiver 11. The energy detected in the receiver 11 is converted into an electrical voltage which is transmitted to the surface of the earth by way of a cable 12. The transmitter 10 and the receiver 11 are mechanically interconnected by a coupling unit 13. Both the transmitter 10 and the receiver 11 include rigid walled enclosures or chambers, each of a thickness through all portions thereof sufficient to withstand pressures encountered in deep bore holes. Sound energy generated by the transmitter 10 travels to the receiver 11 over several paths, i. e., directly through the coupling 13, through the liquid filling the bore hole surrounding the transmitter and receiver and, additionally, through the formations forming the walls of the hole in which the probe or tool is positioned. The amplitude and phase of energy traveling through coupling 13 is controlled for production of useful logs of desired character by mixing or blending with the waves traveling through media adjacent thereto.

In one form of the invention, the pulse transmitter may comprise an elongated metallic cylinder 20 enclosing an acoustic generator which may be of the form of a properly excited electro-mechanical transducer such as a cylindrical piezo-electric crystal 21. As is well understood by those skilled in the art, application of a voltage between the inner and outer surfaces of the crystal 21 illustrated in Fig. 1 produces variations in the dimensions of the crystal. The circuit for exciting the crystal 21 includes batteries 22 connected in series with a circuit interrupting switch 23 and a vibrator 24. The batteries 22, which may be in the form of one and one-half volt dry cells, plus the switch 23 and the vibrator 24 preferably are mounted rigidly on a chassis generically represented by discs 25 and 26 interconnected by supports 27 and 28. The crystal 21 may conveniently be carried by or otherwise fastened to the lower disc 26. In the form illustrated in Fig. 1, resilient cushioning discs 21a are placed adjacent to each end of the crystal 21. A metal washer 21b is placed below the lower disc 21a and a bolt 21c passes through washer 21b and along the axis of crystal 21 and threadedly engages the metal disc 26.

The lower end of the rigid walled cylinder 20 is closed by a streamlined end member 30 threadedly engaging the end of the tube 20. A liquid-tight seal is provided by the use of O-rings 31 between the end member 30 and the end of the cylinder 20. A cushion 30a of a resilient material is provided to support the end of bolt 21c at the lower end of the crystal 21. The upper end of the cylinder 20 is closed and sealed by the threaded insert 32 and O-ring 33, both of which form parts of and are carried by the coupling member 13. The lower portion of the cylinder 20 is filled with oil not shown in the lower cylinder 20 to avoid obscuring details of construction but sufficient to inundate or cover the crystal 21. Thus, variations in the dimension of crystal 21 upon excitation thereof are transmitted by way of the oil bath to the cylinder 20. The cylinder 20 then acts as a radiator of sound waves generated by the crystal.

The receiver 11 is similar in construction to the transmitter 10 and includes a heavy walled tube 40 closed at its lower end by a threaded insert 41 and at the upper end thereof by a streamlined end member 42. A receiver crystal 43 is positioned near the lower end of the cylinder 40 and is supported from an amplifier carrying the chassis which includes discs 44 and 45 and spacers 46 and 47. An amplifier generically represented by the block 47a is connected to the crystal 43 for reception and amplification of electrical signals generated upon receipt at crystal 43 of acoustic signals. The cable 12 extending from the upper end of the streamlined member 42 includes a pair of conductors 48 and 49 for the transmission of the electrical signals to the surface of the earth. Ordinarily, one conductor is centrally disposed within and insulated from an outer conducting sheath to form what in the logging art is termed a "single conductor cable."

The cylinders 20 and 40 are made watertight and thus preclude the application of bore hole pressures to the enclosed crystals. The crystal 43 is positioned near the lower end of cylinder 40 and is also immersed in a liquid bath as indicated by the dashed horizontal lines for the transmission of acoustic energy between the crystal and its associated cylinder wall.

In operation, variations in the dimensions of crystal 21 produce pressure variations in the oil bath that are transmitted to the walls of cylinder 20. Pressure variations impinging the cylinder 40 are transmitted by way of the oil bath in the cylinder 40 to the crystal 43 and produce potentials between the inner and outer walls of the crystal cylinder 43. When amplified and transmitted to the earth's surface, the electrical impulses are recorded on a strip chart as a function of hole depth and thus portray the acoustic properties of the formations traversed by the exploring tool.

The coupling unit 13 mechanically interconnecting the cylinders 20 and 40 includes the threaded inserts 32 and 41 which form end closure members for the upper end of the cylinder 20 and the lower end of cylinder 40, respectively. As will hereinafter be more fully explained, the material forming the portion 50 of the coupling member 13 will be chosen to provide a section between the transmitter 10 and receiver 11 that is acoustically mismatched with respect to the cylinders 20 and 40, selectively to control the phase and amplitude of energy traveling directly by way of the instrument itself from the transmitter 10 to the receiver 11.

It will be appreciated that, since in the transmitter energy for driving the crystal 21 is obtained from self-contained units such as dry cells, the level of the acoustic energy generated is relatively low; so low that noise produced as the unit is pulled through the bore hole may exceed the acoustic energy produced by the crystal 21. The effect of externally generated noise is eliminated by encasing the whole system in streamlined resilient sheath of material such as rubber. As illustrated in Fig. 1, a sheath 51 completely encases the cylinder 20. Sheath 52 encases the coupling 13 and a sheath 53 encases the cylinder 40. With the system thus constructed, the tool may be lowered to the bottom of a drill hole and then may be raised at a uniform rate in a manner well known to those skilled in the well logging art. Energy generated by crystal 21 will be transmitted via the several possible paths to the energy receiving chamber 11 where the acoustic energy is detected and converted into electrical energy by crystal 43 and applied to the amplifier 47 and is then transmitted by way of conductors 48 and 49 to surface indicating and recording instruments.

Figure 2:
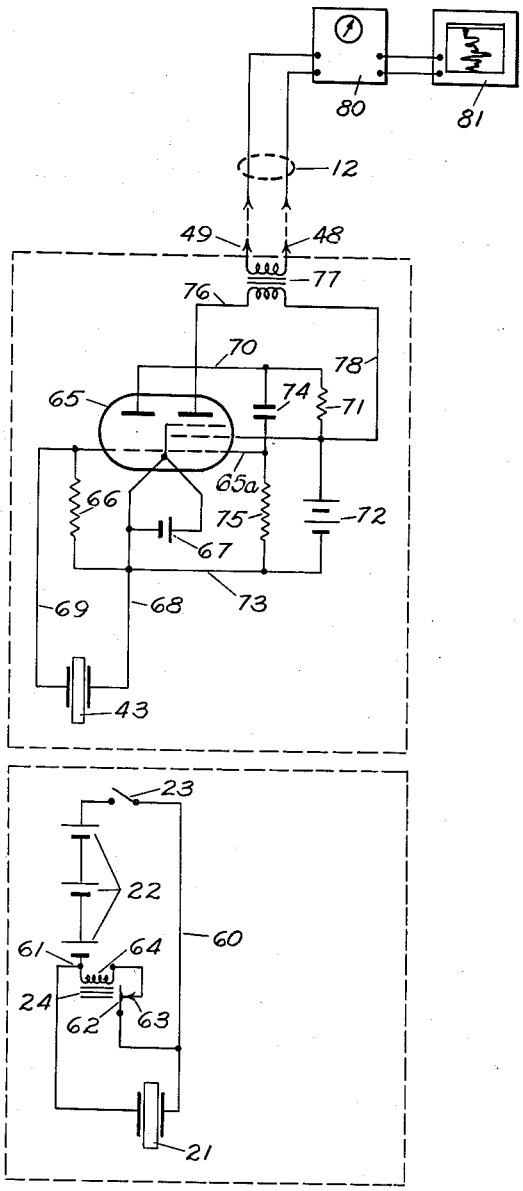
Fig. 2 is a schematic diagram of the electrical system of the logging instrument of Fig. 1 together with surface detecting and recording instruments.

The equivalent electrical circuit for the system of Fig. 1 is illustrated in Fig. 2. Where possible, the reference characters of Fig. 1 have been given corresponding parts in Fig. 2. The circuit of the transmitter comprises three voltage cells 22 connected in a series circuit which also includes the single pole switch 23 and a conductor 60 leading to the armature 62 of a vibrator 24. The electrical circuit of the vibrator 24 is completed from the armature 62 to the contact 63 and thence by way of the actuating coil 64 to the batteries 22. The crystal 21 is connected between the armature 62 and the terminal 61 of the vibrator 24. When switch 23 is closed, a series of uniformly spaced electrical impulses are applied to the contacts of the crystal 21, the rate of application depending upon the design of the vibrator 24. While energy from the crystal 21 may have any one of several wave shapes, it is preferred to use relatively sharp pulses of short duration regularly spaced one from the other and repeated at a frequency in the sonic range. This type of signal is preferred over continuous waves since the latter type of signals often produce standing waves that obscure the desired information.

The receiving circuit of Fig. 2 includes the crystal 43 connected in the grid circuit of an amplifier which may include a triode-pentode tube 65. The amplifier includes at its input circuit a grid resistor 66 connected between grid and cathode of the input triode. The cathode heater or filament is connected across a filament battery 67 and is connected by way of conductor 68 to one terminal of the receiving crystal 43. The other terminal of the crystal 43 is connected to the input grid by way of conductor 69. The anode of the triode section is connected by way of conductor 70 and load resistor 71 to the positive terminal of a battery 72. The negative terminal of battery 72 is connected to the cathode conductor 68 by way of conductor 73. The screen grid of the pentode stage is connected to the positive terminal of battery 72, and the suppressor is connected to the cathode. The A. C. output of the triode stage is coupled to the control grid 65a by way of condenser 74. A resistor 75 is connected between the control grid and the cathode. The anode of the pentode section is connected by way of conductor 76, the primary of the output transformer 77 and conductor 78 to the positive terminal of battery 72. The secondary of the output transformer 77 is connected by way of conductors 48 and 49 in the cable 12 to an amplifier-detector 80 and a recording device 81 located at the surface of the earth.

The acoustic impulses transmitted by way of the liquid bath surrounding crystal 43 are converted to electrical signals and are applied to the grid of the triode section of tube 65. The amplified signals appearing across the plate resistor 71 are applied by way of condenser 74 to the control grid of the tetrode stage of the tube 65. The output signals from the tetrode corresponding substantially in form to the sound impulses impinging the crystal 43 are then applied to the primary of the transformer 77 and are transmitted up hole via cable 12.

Figures 3, 4:
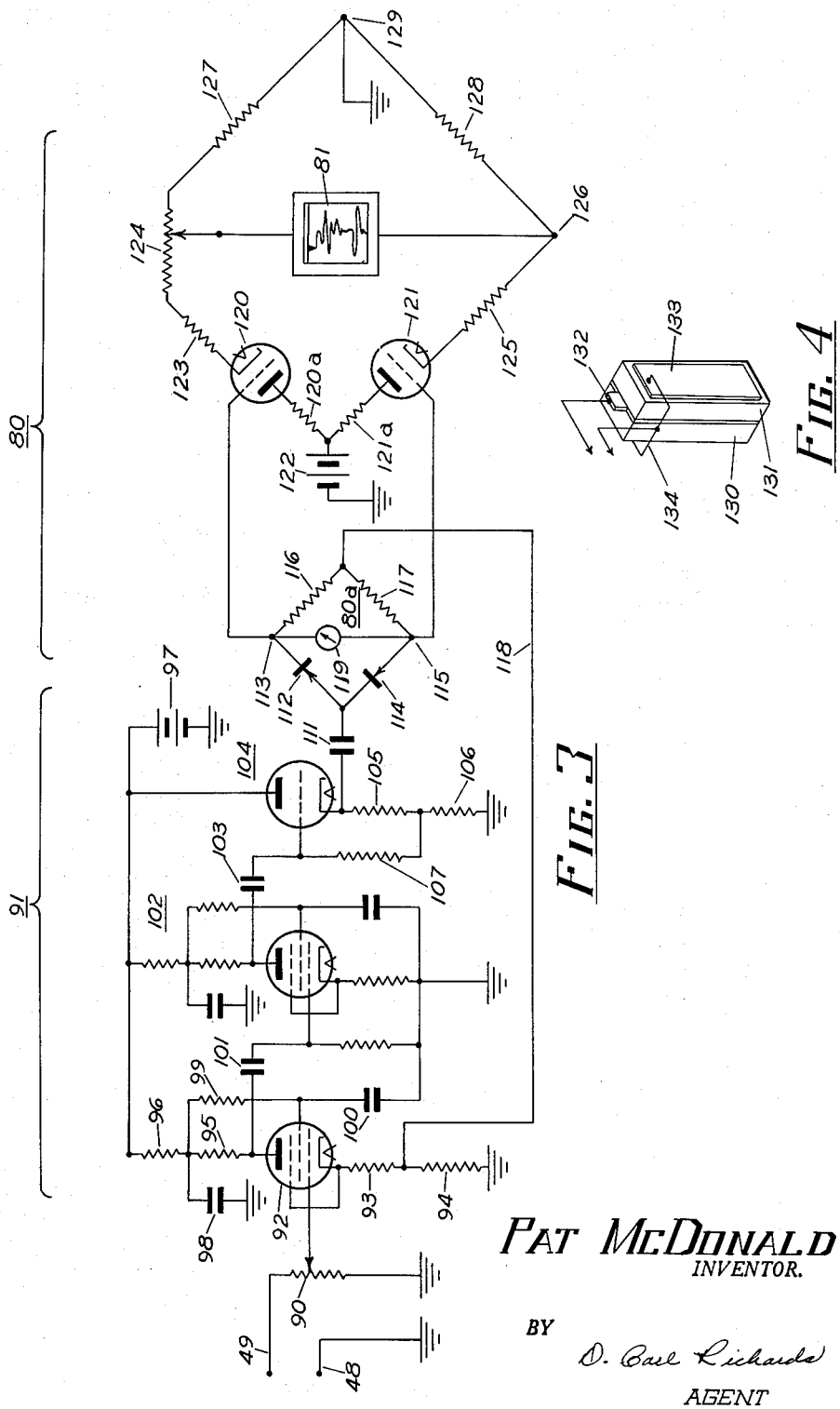
Fig. 3 is a schematic diagram of the surface detecting and recording instrument.
Fig. 4 is a view of one form of crystal unit.

In Fig. 3 there is illustrated in one form an amplifying, detecting and recording circuit that is suitable for observing and recording the response of the exploring tool as it is moved from one formation to another in the bore hole. Conductor 48 is connected to the electrical ground of the surface instrument while conductor 49 is connected through the input grid resistor 90 to ground. From the input resistor 90 the signal is passed through a three stage amplifier 91. In the first amplifier stage a pentode 92 has a cathode resistor 93 and a feedback resistor 94 connected in its cathode circuit. In the anode circuit thereof there is provided a series circuit including a load resistor 95 and a de-coupling resistor 96 which is connected to the positive terminal of a B-battery 97. A de-coupling condenser 98 is connected between ground and the juncture of resistors 95 and 96. The screen of pentode 92 is provided with voltage by way of resistor 99 with the screen de-coupling condenser 100 connected from screen grid to ground. The output signal from the pentode 92 is applied by way of coupling condenser 101 to the grid of a conventional amplifier stage 102. The output of the stage 102 is coupled by way of condenser 103 to the input of a cathode follower output triode 104. The output stage including triode 104 includes cathode resistors 105 and 106 and a grid resistor 107 connected between the grid of the triode 104 and the juncture between resistors 105 and 106.

Thus, the voltages appearing across the input resistor 90 are amplified and appear across the relatively low impedance output comprised of the resistors 105 and 106. The output signals from the amplifier 91 are then applied to a bridge network in the rectifier-detector 80 by way of coupling condenser 111. It will be recognized that the signals from crystal 43 are of varying amplitude and length, depending upon the nature of the formations encountered. In order to produce an indication that may be displayed on a meter or that may conveniently be recorded, the output voltages appearing across cathode resistors 105 and 106 are converted into direct current voltages that appear across the vertical diagonal of the bridge network 80. More particularly, the bridge network 80a includes a rectifier 112 connected betwen condenser 111 and the bridge terminal 113. A similar rectifier 114 is connected between the bridge terminal 115 and condenser 111. The rectifiers 112 and 114 are oppositely poled with respect to the condenser 111. The bridge is completed by resistive arms 116 and 117. The terminal of the bridge opposite condenser 111 is connected by way of conductor 118 to the juncture of the cathode resistor 93 and feedback resistor 94 of the input stage of the amplifier 91. A circuit including meter 119 is connected across the output diagonal (between terminals 113 and 115) of the bridge 80a. Thus, at any instant (or for any position of the exploring unit in the bore hole) the magnitude of the signal received by the crystal 43 controls the deflection of the meter 119.

More particularly, when the voltage between the output terminal of the condenser 111 and ground is positive, current flows from ground through feedback resistor 94 and conductor 118 to the bridge terminal common to resistors 116 and 117. Current flow is then produced through resistor 117 and through the path parallel thereto including resistor 116 and meter 119 to the juncture 115. From terminal 115, the current flows through the rectifier 114 to the condenser 111. Similarly, when the output voltage appearing at condenser 111 is negative with respect to ground, current flows from condenser 111 through rectifier 112 to the juncture 113 and thence through the parallel circuit including resistor 116 and the meter 119 in series with resistor 117 and thence by way of conductor 118 and feedback resistor 94 to ground. Thus, regardless of the polarity of the output voltage, unidirectional current flows through meter 119 that is proportional to the magnitude of the output voltage.

In order to produce a permanent record of variations of the acoustic properties of the bore hole, the voltage appearing across the rectifier-bridge 80a may be applied to a strip recorder. One recorder suitable for the purpose is manufactured by the Brown Instrument Company and is sold under the trade name "Brown 'Electronik' Potentiometer." A circuit for providing an input voltage to a recorder of the foregoing type is illustrated in Fig. 3 and includes a bridge network having triodes 120 and 121 with anodes connected through load resistors 120a and 121a and B-battery 122 to ground. The cathode of tube 120 is connected by way of resistor 123 to a potentiometer 124. The cathode of tube 121 is connected by way of resistor 125 to the terminal 126. The bridge is completed by resistors 127 and 128 connected in series between the point 126 and the potentiometer 124. The common juncture 129 between resistors 127 and 128 is connected to ground. The recorder represented by block 81 may then be connected between the juncture 126 and the variable tap on the potentiometer 124, the tap being provided to adjust the zero level of the output of the bridge network.

The foregoing description has concerned one form of an exploring apparatus that has been found capable of producing logs of well bores that are useful in determining the characteristics of the formations adjacent thereto. In Fig. 1 the crystals 21 and 43 are illustrated as being hollow cylinders. Crystals cast of barium-titanate in the form of a cylinder approximately two inches in diameter and six inches long with a wall thickness of approximately one-fourth inch have been found to be suitable. The steel cylinders (20 and 40) of a wall thickness of approximately one-fourth inch were utilized to house the crystals which were immersed in a bath of oil having a high acoustical conduction factor for transmission of sound to and from the walls of the cylinders. An oil preferably of vegetable origin is used to prevent deterioration of rubber portions of the structure. Castor oil has been found to be suitable. By providing such an enclosure for the crystals, there is eliminated the possibility of extremely high pressures encountered in the bore holes disrupting or preventing the operation of the crystals. Because of the space limitations on the self-contained battery source 22, it will be recognized that the level of the energy transmitted to the earth formations is relatively low and it is necessary that the vibrations be transmitted through the oil bath and the cylinder walls. However, it has been found that logs clearly defining stratification may be obtained at very low signal levels. The provision of the sheaths 51, 52 and 53 permits the use of the low level transmitted signals, the received signals being substantially above any generated by the movement of the unit as it is drawn out of the bore hole. The low level system is particularly advantageous in that the self-contained source of acoustic energy does not require separate circuits to a source of supply voltage at the surface of the earth. The foregoing is illustrative of one form of system, which, in accordance with the present invention, may be used to portray in a graphic manner variations in the acoustic properties of formations. Variations may be made in the specific form above described.

For example, in Fig. 4 there is illustrated an alternative form of crystal unit, including two ammonium dihydrogen phosphate crystals, suitable for use as source or receiver crystals 20 and 43. Two crystal slabs 130 and 131, one-half inch thick, one and one-half inches wide and approximately three inches long, were placed face to face and were excited by applying a voltage between a terminal 132 common to adjacent faces and to opposed terminals 133 (one of which is not shown) which are electrically common to the opposite faces of the crystals 130 and 131, being interconnected by conductor 134. It has been found desirable to insure that crystals of the type shown in Fig. 4 be properly oriented. More particularly, best results are obtained with the faces of the sending crystal maintained or restrained in a plane parallel to that of the receiving crystal.

In instances where sufficient conductors are available in the cable 12 for supplying power from the surface of the earth, magnetostriction generators may be utilized. It is not practical to provide a self-contained source of power for such magnetostriction device as it is with crystals since magnetostriction devices do not possess the high electromechanical efficiency that is characteristic of the above-described crystals. However, the advantages of housing the transmitter and receiver within a chamber formed by rigid walls of such thickness throughout all portions to withstand the pressures existing in deep bore holes will be appreciated since neither the crystal sources nor magnetostriction sources operate satisfactorily under high pressures.

In operation of the instrument, it has been found that records of a wide variety of character may be obtained from the same bore hole by variation in the characteristics of the coupling member 13 with all other parts of the system being maintained constant. This is due to the fact that a portion of the energy received by the detector crystal 43 of Fig. 1 is transmitted directly from the cylinder 20 through the coupling medium 50 to the receiving cylinder 40. The acoustic impedance of the path between cylinders 20 and 40 controls both the phase and the amplitude of the directly communicated energy. It has been found that a coupling 13 which, in general, is acoustically mismatched but which has substantially the same outer diameter as the body of the transmitting chamber and the receiving chamber is most desirable. With the cylinder 20 coupled directly to the cylinder 40, the directly transmitted energy is so great as to mask any variations in the energy received by crystal 43 via an earth formation path. When a small diameter coupling such as a rope or a bolt suspending the transmitter 10 below the receiver 11 is used, it has been found that the signal was also masked but not as completely as when a large diameter steel coupling is used. Thus, it has been determined that a solid coupling member of a material of low acoustical conductivity or high acoustical impedance, in contrast with the high acoustical conductivity or low acoustical impedance material of the cylinders 20 and 40 is preferred. One material, lead, has been found to present a desirable blending of the received signals at the receiving crystal and has sufficient strength to make its use practical. In one form, the steel inserts 32 and 41 were placed in a mold and cast in lead. A coupling of material such as rubber or a phenol condensate product sold under the trade-name of "Bakelite" or "Micarta" has been found to yield logs of desirable character showing clearly the variations in the acoustic properties of the wall of a bore hole. However, due to their frangible nature under strain, materials of the latter type must be used with care in order to avoid damage to the coupling unit. Other materials may be found to be suitable for presenting the desired acoustic mismatch. This, however, will depend upon not only the character of the material used for the coupling 13 and cylinders 20 and 40 but also upon the character of the formations adjacent the well bore. The factor that controls the selection of the material is the blending of the directly transmitted wave and of the wave penetrating the formations to produce a log that clearly pictures formation breaks.

While specific embodiments have been described above, the invention is not intended to be in any way limited thereby but is susceptible of numerous changes in form and details within the scope of the appended claims.

What is claimed is:

1. In an acoustic well logging system having cable-supporting means for movement along the bore of a well, the combination comprising a pair of sound chambers, each formed by an elongated rigid metallic cylinder of high acoustical conductivity with walls presenting a large contact area for bore hole fluids and of adequate thickness to withstand the hydrostatic pressures existing in deep bore holes, a metallic structure of low acoustical conductivity interposed between and interconnecting adjacent ends of said chambers and forming a high acoustic impedance between them, an acoustically conductive liquid at least partially filling each of said chambers, a transducer for each of said chambers, and means supporting each of said transducers in spaced relation with the walls of its associated sound chamber for transmission and reception respectively of acoustical energy to and from said walls substantially entirely by way of said liquid.

2. The combination set forth in claim 1 in which said metallic structure includes a member formed of lead interposed between the adjacent ends of said two chambers and providing a path for transmission of acoustic energy from the transmitter to the receiver in fixed phase and in amplitude attenuated to a fraction of that transmitted from said acoustically conductive liquid to the walls of the transmitting chamber, said acoustic energy of fixed phase and attenuated amplitude transmitted through said lead member combining with acoustic energy of variable amplitude and phase traveling from said transmitting transducer to said receiving transducer by way of formations adjacent said bore hole.

References Cited in the file of this patent

UNITED STATES PATENTS

| Number | Name | Date |
|---|---|---|
| 2,156,052 | Cooper | Apr. 25, 1939 |
| 2,283,429 | Ennis | May 19, 1942 |
| 2,405,209 | Harry | Aug. 6, 1946 |
| 2,425,868 | Dillon | Aug. 19, 1947 |
| 2,440,903 | Massa | May 4, 1948 |
| 2,448,365 | Gillespie | Aug. 31, 1948 |
| 2,490,236 | Shaper | Dec. 6, 1949 |
| 2,524,031 | Arps | Oct. 3, 1950 |
| 2,595,241 | Goble | May 6, 1952 |